United States Patent
Eber et al.

(10) Patent No.: US 11,258,480 B2
(45) Date of Patent: Feb. 22, 2022

(54) SYSTEM AND METHOD OF OPTIMIZED BACKUP FUNCTIONALITY FOR ELECTRONIC CONTROL KEY

(71) Applicant: NXP B.V., Eindhoven (NL)

(72) Inventors: Wolfgang Eber, Styria (AT); Dorian Haslinger, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/835,681

(22) Filed: Mar. 31, 2020

(65) Prior Publication Data

US 2021/0306033 A1 Sep. 30, 2021

(51) Int. Cl.
| | |
|---|---|
| *H04B 5/00* | (2006.01) |
| *H02J 50/10* | (2016.01) |
| *H04W 4/80* | (2018.01) |
| *B60R 25/24* | (2013.01) |

(52) U.S. Cl.
CPC ........... *H04B 5/0037* (2013.01); *B60R 25/24* (2013.01); *H02J 50/10* (2016.02); *H04W 4/80* (2018.02)

(58) Field of Classification Search
CPC ........... G07C 2009/00611; G07C 2009/00603; G07C 2009/0038; G07C 2009/00579; G07C 2009/00587; H02J 50/10; H02J 7/0048; H04B 5/0037; H04W 52/0261; H04W 4/80; B60R 25/24; B60R 25/241

See application file for complete search history.

(56) References Cited

U.S. PATENT DOCUMENTS

| | | | | |
|---|---|---|---|---|
| 9,328,531 | B1* | 5/2016 | Smeikle | G07C 9/00174 |
| 10,089,807 | B2* | 10/2018 | Pluss | G07C 9/00563 |
| 10,202,101 | B2* | 2/2019 | Kim | G07C 9/00309 |
| 10,440,576 | B1* | 10/2019 | Casamassima | G07C 9/00309 |
| 2002/0109582 | A1 | 8/2002 | Mooney et al. | |
| 2006/0176147 | A1* | 8/2006 | Pohlmann | B60R 25/24 |
| | | | | 340/5.61 |
| 2006/0219776 | A1* | 10/2006 | Finn | G06K 19/07732 |
| | | | | 235/380 |
| 2009/0284345 | A1* | 11/2009 | Ghabra | B60R 25/406 |
| | | | | 340/5.61 |

(Continued)

FOREIGN PATENT DOCUMENTS

WO 2012/016905 A1 2/2012

*Primary Examiner* — Lewis G West

(57) ABSTRACT

A key fob including at least one wireless communication circuit, a power supply node coupled to provide power to the at least one wireless communication circuit, a battery node, a battery power circuit, and an inductive power circuit. The battery power circuit provides power when a battery with sufficient charge is provided. The inductive power circuit only provides power when energized with inductive power when the battery is not provided or is not sufficiently charged. The inductive power circuit may include a rectifier circuit and an inductor and may further include regulator circuitry. The inductive power circuit does not perform wireless communications thereby simplifying circuitry and operation of the key fob and a corresponding access system. Since only configured to transfer power, the inductive power circuit may be optimized for power transfer. The access system inductively couples power to the key fob when within a predetermined coupling zone distance.

20 Claims, 2 Drawing Sheets

(56) References Cited

U.S. PATENT DOCUMENTS

| | | | | |
|---|---|---|---|---|
| 2010/0171642 A1* | 7/2010 | Hassan | ............... | B60C 23/0479 |
| | | | | 340/992 |
| 2011/0115605 A1* | 5/2011 | Dimig | ................... | B60R 25/406 |
| | | | | 340/5.61 |
| 2011/0148573 A1* | 6/2011 | Ghabra | ................ | B60R 25/245 |
| | | | | 340/5.61 |
| 2013/0324038 A1* | 12/2013 | Kajihara | .............. | H04B 5/0031 |
| | | | | 455/41.1 |
| 2014/0062655 A1* | 3/2014 | Colburn | ............ | G07C 9/00896 |
| | | | | 340/5.61 |
| 2015/0296348 A1* | 10/2015 | Ghabra | .................. | H04W 4/02 |
| | | | | 455/456.1 |
| 2015/0371768 A1* | 12/2015 | Graham | ................ | H02J 7/0042 |
| | | | | 320/108 |
| 2016/0127473 A1* | 5/2016 | Khan | ................ | H04W 52/0251 |
| | | | | 455/66.1 |
| 2016/0272153 A1 | 9/2016 | Ogura et al. | | |
| 2016/0350989 A1* | 12/2016 | Chang | .................... | H02J 50/00 |
| 2017/0148018 A1* | 5/2017 | Levin | ................... | H04W 12/04 |
| 2017/0309098 A1* | 10/2017 | Watters | ................. | H04W 4/025 |
| 2018/0109148 A1* | 4/2018 | Meng | ...................... | H02J 7/027 |
| 2019/0104473 A1* | 4/2019 | Chun | ................... | H02J 7/00034 |
| 2019/0116556 A1* | 4/2019 | Golsch | ................... | H04W 4/80 |
| 2019/0190319 A1* | 6/2019 | Kawamae | ............... | H02J 5/005 |
| 2019/0206157 A1* | 7/2019 | Cazalis | .............. | G07C 9/00174 |
| 2020/0036213 A1* | 1/2020 | Jeon | ........................ | H02J 50/10 |
| 2020/0119586 A1* | 4/2020 | Russo | .................... | G06F 21/35 |

* cited by examiner

SYSTEM AND METHOD OF OPTIMIZED BACKUP FUNCTIONALITY FOR ELECTRONIC CONTROL KEY

BACKGROUND

Field of the Invention

The present invention relates in general to electronic control keys, and more particularly to a system and method of optimized backup functionality for electronic control key or "key fob."

Description of the Related Art

An electronic control key, or "key fob," is a keyless entry remote device which may be used to perform one or more authorized functions, such as locking or unlocking doors or the like for controlling access to vehicles or other controlled locations (e.g., hotel rooms, apartments, buildings, secure areas, etc.), opening a trunk, activating an alarm, starting an engine, etc. Modern key fobs may include wireless communication technology, such as 5G, Wi-Fi, Bluetooth, Bluetooth Low Energy (BLE), etc., for communicating with a corresponding access control system or the like at the vehicle or other secure location. The key fob and the access control system may include additional wireless technologies, such as ultra-wide band (UWB) or the like, for performing secure distance measurements such as proximity determinations between the key fob and the access control system. A UWB device, for example, may be used to determine when the key fob is within a predetermined threshold distance to facilitate access or other control decisions. The key fob typically includes a battery that provides power to the wireless communication devices. The term "key fob" as used herein contemplates many different configurations of electronic control devices, including conventional vehicle key fob devices and various other electronic Smart Device configurations, such as SmartFOBs, Smart cards, Smart watches, mobile or cellular phones, etc.

When the battery of the key fob is dead or otherwise disconnected, the battery-powered primary communication circuitry of the key fob may be disabled or otherwise unavailable. For this reason, key fobs may include backup communication circuitry remotely powered and controlled. The backup communication circuitry may be independent and secure so that it independently performs the same functions and applications of the primary communication circuitry including secure cryptographic and key store functions. An inductive element may be provided on the key fob that inductively links with the access control system to establish an inductive power and communication link. Existing automotive systems, for example, may use low frequency (LF) technologies in which the cable length to the central base station is critical, or may use near-field communication (NFC) technologies in which the reader electronics are integrated into each coupling device.

There are several issues with current and proposed backup communication devices. The backup communication device must include its own microcontroller and flash memory and must be stand-alone so that it can perform the full application set of the primary communication device. In addition, each of the communication nodes, including the primary communication circuit, the backup communication circuit, and corresponding circuitry in the access control system, is classified as radio equipment requiring related compliance tests and certification. The resulting key fob is relatively complex, expensive to manufacture, and requires significant development time to design and implement appropriate functionality of each microcontroller for each separate communication interface, including, for example, wake up, connection, communications for transferring information, secure distance checks, etc. The inductively linked backup communication devices typically must perform all of these functions except secure distance checks.

BRIEF DESCRIPTION OF THE DRAWINGS

Embodiments of the present invention are illustrated by way of example and are not limited by the accompanying figures. Similar references in the figures may indicate similar elements. Elements in the figures are illustrated for simplicity and clarity and have not necessarily been drawn to scale.

DETAILED DESCRIPTION

The inventors have recognized the need to provide backup functionality for battery-powered electronic control keys (a.k.a., key fobs) when the battery is absent, disconnected, or otherwise not useful (e.g., dead or substantially discharged). They have therefore developed a system and method of optimized backup functionality for key fobs including an inductive link that provides power to the primary circuitry of the key fob but that does not perform communications.

Figure 1:
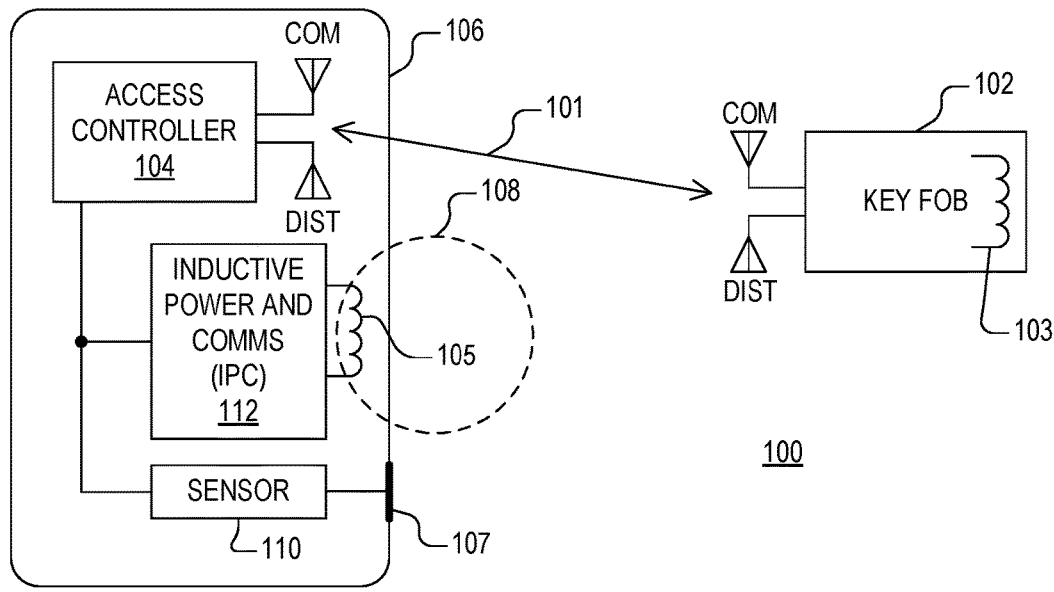
FIG. 1 is a simplified block diagram of a key-based access system implemented according to one embodiment of the present disclosure.

FIG. 1 is a simplified block diagram of an electronic key-based control system 100 implemented according to one embodiment of the present disclosure. An electronic control key, or key fob 102, is configured to establish authorized wireless communications with an access controller 104 contained within a vehicle 106, such as an automobile, van, SUV, truck or the like. The vehicle 106 may also represent any type of controlled location, such as, for example, hotel rooms, apartments, buildings, secure areas, etc. The key fob 102 may be used to perform a variety of different functions, such as locking/unlocking doors, opening a trunk, activating an alarm, starting an engine of the vehicle 106, etc. The key fob 102 and the access controller 104 may each be equipped with wireless communication circuitry that are configured to wirelessly communicate with each other to perform wake up, connection, and communication tasks for access, control and data transfer functions and the like, and for also performing distance measurements between the key fob 102 and the vehicle 106.

As shown, each includes a communication (COM) antenna coupled to internal communication circuitry for performing the primary communications. In one embodiment, for example, each may include a wireless Bluetooth device configured to operate according to the Bluetooth wireless standard including low power versions, such as Bluetooth Low Energy (BLE). Although Bluetooth and BLE are commonly used for such functions, alternative wireless communication technologies are also contemplated for performing the same or similar functions, such as 5G or Wi-Fi and the like. In addition, the key fob 102 and the access controller 104 may each be equipped with additional wireless communication circuitry configured to wirelessly communicate with each other to perform distance (DIST) measurements or and the like for localization functions including determining the relative proximity of the key fob 102. As shown, for example, each includes a distance antenna DIST coupled to internal communication circuitry for performing wireless communications associated with measuring a distance between the key fob 102 and the access controller 104. In one embodiment, for example, each may include an ultra-wideband (UWB) device configured to operate using UWB technology.

During normal operation, the key fob 102 may be used to perform any of one or more different authorized functions, such as locking/unlocking doors, opening a trunk, activating an alarm system, starting an engine of the vehicle 106, etc. Many of these authorized functions may be activated by one or more pushes of one or more buttons other interfaces (not shown) provided on the key fob 102. Other authorized functions, such as passive keyless entry (PKE), may be performed without human action. When the key fob 102 is within a predetermined threshold distance 101 from the vehicle 106, an authorized wireless communication session may be established to allow wireless communications between the key fob 102 and the access controller 104 to perform any of the desired authorized functions. The threshold distance 101 is a predetermined to ensure that the key fob 102 is nearby the vehicle 106 for enabling the authorized functions. In one embodiment, the predetermined threshold distance 101 is on the order of a few meters, such as 2-3 meters or the like, although any suitable distance threshold less than or greater than 2-3 meters is contemplated. The key fob 102 may include memory or the like storing a secure key or code which may be encrypted and transferred for purposes of authentication. The COM and DIST functions are supported by corresponding communication circuitry, described further below, powered by a battery or the like.

When the battery of the key fob 102 is absent, disconnected, or dead (or substantially discharged), then the normal wireless communications, including COM and DIST functions, might otherwise be disabled such as is the case for legacy or conventional key fob configurations. The key fob 102 includes an inductive element 103 which may be used to establish an inductive link with a corresponding inductive element 105 located on or within the vehicle 106. The inductive elements 103 and 105 may each be implemented as physical inductors, although alternative inductive configurations are contemplated. When the inductive elements 103 and 105 are sufficiently close to one another, such as within a predetermined coupling zone 108, then the inductive link may be established for transferring power and energizing the circuitry of the key fob 102. In one embodiment, the location of the inductive element 105 of the vehicle 106 is marked or otherwise known by the user, such as at or near a door handle or the like. The coupling zone 108 may be a predetermined distance, such as 5-8 centimeters (or 2-3 inches) or the like. The user positions the key fob 102 so that the inductive element 103 of the key fob 102 is within the coupling zone 108 of the inductive element 105.

Various methods are contemplated for detection of the presence of the key fob 102. In the illustrated embodiment, a sensor 110 is provided on or within the vehicle 106. The sensor 110 may be configured according to any suitable method and may include a sensor interface 107 configured according to the particular sensor type. The sensor interface 107 may a button, an inductive object detector, a capacitive sensor, etc. In one embodiment, the sensor interface 107 may be sufficiently close to the inductive element 105 for detecting the inductive element 103 when within the coupling zone 108. In another embodiment, the sensor interface 107 is a button that is pressed by a user. In yet another embodiment, the sensor interface 107 may be a touch pad or the like configured as a capacitive sensor. In yet another embodiment, the sensor 110 is avoided and the inductive element 105 itself may be used as the sensing device. Once proximity is detected indicating a possible inductive link, the sensor 110 wakes up or otherwise activates the access controller 104. Either the sensor 110 or the access controller 104 activates an inductive power generator (IPG) 112 electrically interfaced with the inductive element 105. When activated, the IPG 112 energizes the inductive element 105 to transfer power to the inductive element 103 of the key fob 102. As described further herein, once energized, the primary wireless communications (COM) of the key fob 102 are powered to enable normal wireless communications to commence.

In one embodiment, only limited circuitry of the key fob 102 is energized by the inductive link, such as, for example, only the COM functions. In this limited activation embodiment, the DIST communications may remain disabled since not necessary for measuring distance of the key fob 102 since assumed to be within the coupling zone 108 which has a radius much smaller than the threshold distance 101. In another embodiment, the entire circuitry of the key fob 102 may be energized by the inductive link.

Figure 2:
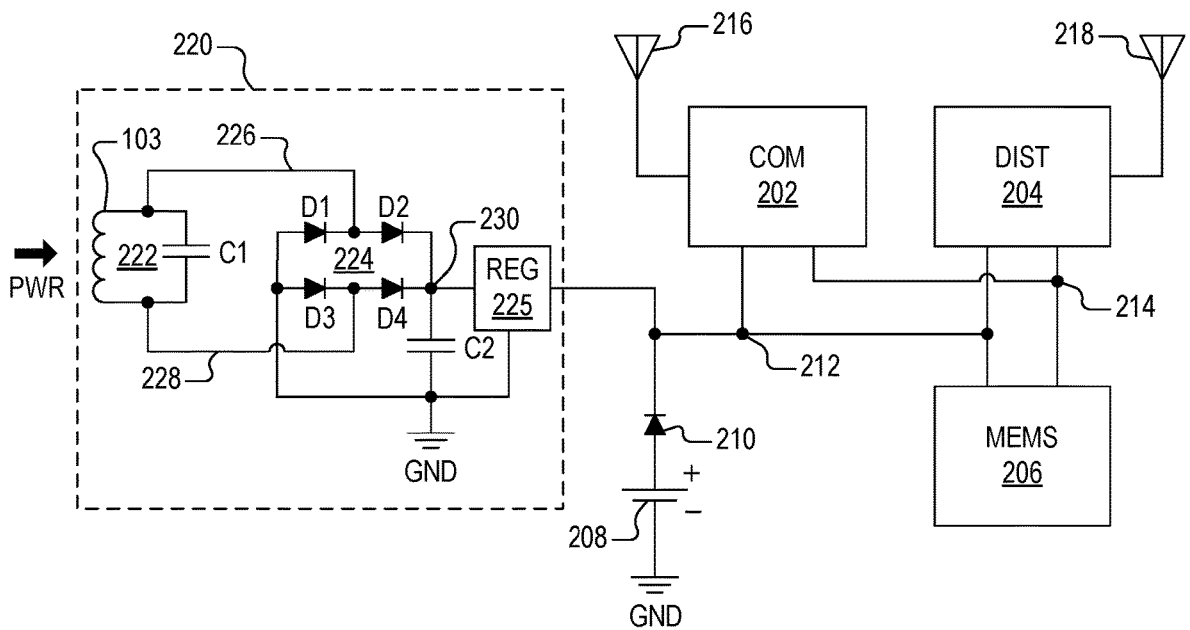
FIG. 2 is a simplified schematic and block diagram of the circuitry of the key fob of FIG. 1 according to one embodiment of the present disclosure.

FIG. 2 is a simplified schematic and block diagram of the circuitry of the key fob 102 according to one embodiment of the present disclosure. The circuitry includes COM circuitry 202, DIST circuitry 204, and MEMS circuitry 206. The COM circuitry 202 establishes primary wireless communications with corresponding COM circuitry (not shown) of the access controller 104, which is otherwise referred to as "authorized" communications. In the illustrated embodiment, COM is the primary communication method between the key fob 102 and the access controller 104, although alternative wireless communication technologies are contemplated. The DIST circuitry 204 operates according to suitable wireless technology for performing distance measurements for localization of the key fob 102. It is noted that the COM and DIST circuitry of the key fob 102 may be combined into a single wireless communication device performing the functions of both. When BLE or the like is used for performing the COM functions, however, BLE may not be able to perform proper localization in a targeted environment with acceptable speed, so that UWB circuitry or the like is better suited for the DIST functions.

The MEMS circuitry 206 may be used for various purposes including energy savings and the like. The key fob circuitry further includes a battery 208 having a negative terminal coupled to ground (GND) and a positive terminal coupled to an anode of a power diode 210, having its cathode coupled to a power supply node 212 developing a supply voltage VDD. The power supply node 212 is coupled to power inputs of the COM circuitry 202, the DIST circuitry 204, and the MEMS circuitry 206. A communication bus 214 is provided to enable internal communications between the COM circuitry 202, the DIST circuitry 204, and the MEMS circuitry 206, and may be implemented in any suitable manner such as, for example, a serial peripheral interface (SPI) or the like. A COM antenna 216 is coupled to the COM circuitry 202 and a DIST antenna 218 is coupled to the DIST circuitry 204, although a single antenna is contemplated in different embodiments.

The circuitry of the key fob 102 further includes an inductive power circuit 220. The inductive power circuit 220 includes an LC tank circuit 222, a rectifier circuit 224, and a regulator circuit 225. The LC tank circuit 222 includes the inductive element 103, shown as an inductor, and a filter capacitor C1. The inductive element 103 has a first terminal coupled to a first terminal of C1 at a first node 226 and has a second terminal coupled to a second terminal of C1 at a second node 228. The rectifier circuit 224 includes four diodes D1, D2, D3, and D4 coupled in a bridge configuration. Node 226 is coupled to the cathode of D1 and to the anode of D2, and node 228 is coupled to the cathode of D3 and to the anode of D4. The anodes of D1 and D3 are coupled to GND, and the cathodes of D2 and D4 are coupled to a node 230. The regulator circuitry 230 is shown coupled between node 230 and the power supply node 212 and may be referenced to GND. A filter capacitor C2 is coupled between node 230 and GND.

In one embodiment, the regulator circuitry 225 may simply be a Zener diode or a voltage limiter or the like coupled between node 230 and GND for limiting voltage of VDD to a predetermined voltage level, in which case node 230 may be directly coupled to (or otherwise may be the same as) the power supply node 212. Alternative voltage limiting or voltage protection or regulator devices or circuits are contemplated, such as a low-dropout (LDO) regulator or a DC-DC regulator or the like for converting or limiting the voltage developed on node 230 to limit VDD to a desired voltage level or within a desired voltage range.

In operation of the circuitry of the key fob 102 shown in FIG. 2, when the battery 208 is provided and sufficiently charged for battery operation, the battery voltage forward biases the power diode 210 and charges the supply voltage VDD to provide power to the COM circuitry 202, the DIST circuitry 204, and the MEMS circuitry 206 for normal operation. When the battery 208 is absent, disconnected, or otherwise not functional (e.g., dead or substantially discharged) and the inductive elements 103 and 105 are within the coupling zone 108 establishing an inductive link, and when the IPG 112 is activated to energize the inductive element 105 with alternating current (AC) for inductive power mode, corresponding AC current flows through the inductive element 103 generating AC voltage across the nodes 226 and 228. The AC voltage is full wave rectified by the rectifier circuit 224 and filtered by the capacitor C2 to develop a corresponding voltage on node 230. The regulator 230 either limits the voltage or converts the voltage to the desired voltage level of the supply voltage VDD. Rather than providing separate backup communications via the inductive link, the COM circuitry 202 is powered to enable primary wireless communications with the access controller 104.

In one embodiment of the inductive power mode, the DIST circuitry 204 and the MEMS circuitry 206 are both disabled to conserve energy for the COM circuitry 202. In another embodiment of the inductive power mode, only the DIST circuitry 204 is disabled and the MEMS circuitry 206 is enabled. In yet another embodiment of the inductive power mode, the COM, DIST and MEMS circuits 202, 204, and 206 are enabled. It is noted that during the inductive power mode when the inductive elements 103 and 105 are inductively linked, the distance measurement functions of the DIST circuitry 204 may be considered superfluous and unnecessary. Also, it is noted that during the inductive power mode when the inductive elements 103 and 105 are inductively linked, any motion sensor functions of the MEMS circuitry 206 may be considered superfluous and unnecessary.

In any event, the inductive link formed by the inductive elements 103 and 105 is only used to transfer power from the IPG 112 to the circuitry of the key fob 102 using the inductive power circuit 220 and is not used for purposes of communication. Although the key fob 102 may include additional circuitry not shown, such as battery charging circuitry for charging the battery 208 via the inductive link, in no event is the inductive link used for purposes of communication. In this manner, a separate secure backup communication device is eliminated substantially simplifying the circuitry of the key fob 102. This eliminates the need for a separate microcontroller and corresponding memory for supporting the functions of backup communication configurations. In addition, the inductive link need not be classified as radio equipment requiring related compliance tests and certification since only used for power transfer functions, resulting in reduced effort for compliance tests (radio compliance) and certification. Also, since data communication is avoided on the inductive link, no modulation is done and thus the system can be tuned for highest efficiency, such as a high Q factor and the like.

Figure 3:
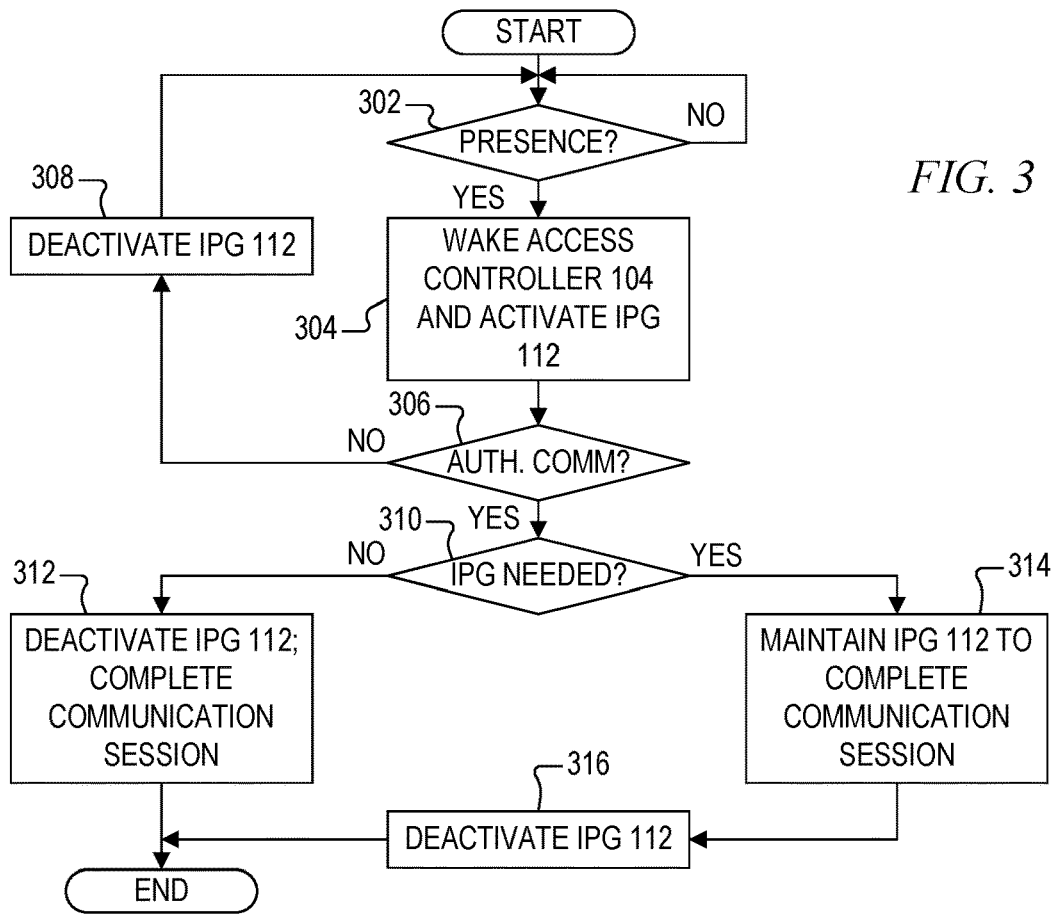
FIG. 3 is a flowchart diagram illustrating operation of the circuitry of the vehicle including the access controller, the sensor and the IPG of FIG. 1 according to one embodiment of the present disclosure.

FIG. 3 is a flowchart diagram illustrating operation of the circuitry of the vehicle 106 including the access controller 104, the sensor 110 and the IPG 112 according to one embodiment of the present disclosure. Operation begins at block 302 to perform a presence inquiry. The presence inquiry is performed by the sensor 110 which depends upon its particular configuration. When the sensor interface 107 is configured as a button and the button is pressed by a user, then presence is true. When the sensor interface 107 is configured as a capacitive sensor configuration and when a user comes close to or touches the sensor interface 107, then presence is true. When the sensor interface 107 is configured as an inductive object load detector and when the inductive element 103 (or any similar inductive element or device) is sufficiently close to the sensor interface 107, then presence is true. While presence is false, operation loops at block 302 representing sensor 110 monitoring.

When presence is true, operation advances to block 304 in which the sensor 110 awakens the access controller 104, and either the sensor 110 or the awakened access controller 104 then activates the IPG 112. If the key fob 102 is present and inductively linked, then activation of the IPG 112 provides power to the circuitry of the key fob 102 as previously described. At next block 306, it is queried whether authorized communication (AUTH. COMM) with the key fob 102 is established. In one embodiment, authorized communication is established between the COM circuitry 202 of the key fob 102 and corresponding COM circuitry within the access controller 104. When the key fob 102 is powered on or otherwise awakened, it attempts to establish a communication session with the access controller 104. At block 306, the access controller 104 determines whether the key fob 102 is authorized, such as detection of a correct key or code value. If the key fob 102 is not present, or if a nearby device or entity triggering presence is not an authorized device, such as a different or unauthorized key fob or simply a nearby foreign inductive or capacitive element or accidental pressing of the sensor button, then operation advances to block 308 in which the IPG 112 is deactivated, and then operation loops back to block 302. It is noted that a timeout function may be implemented to deactivate the IPG 112 to prevent damage to a foreign object.

If the key fob 102 is present and an authorized communication session is established, then operation advances to block 310 to query whether the IPG 112 is needed for providing power. For normal operations in which the battery 208 is present and charged, then operation proceeds to block 312 in which the IPG 112 is deactivated, the communication session is completed per normal operation, and operation is completed. On the other hand, if the IPG 112 is needed to provide power to the key fob 102, then operation advances instead to block 314 in which the IPG 112 remains activated to complete the communication session. When the communication session is completed, operation advances to block 316 to deactivate the IPG 112, and operation is completed. In one embodiment, during authorized communication, the key fob 102 informs the access controller 104 whether the IPG 112 is needed or not, such as by setting a bit in a register or control field or the like, or else by sending an instruction or command or the like. In another embodiment, the IPG 112 may sense power consumption via the inductive element 105 and if authorized communication is established with the key fob 102, then it is assumed that the IPG 112 is necessary to provide power to the key fob 102.

Figure 4:
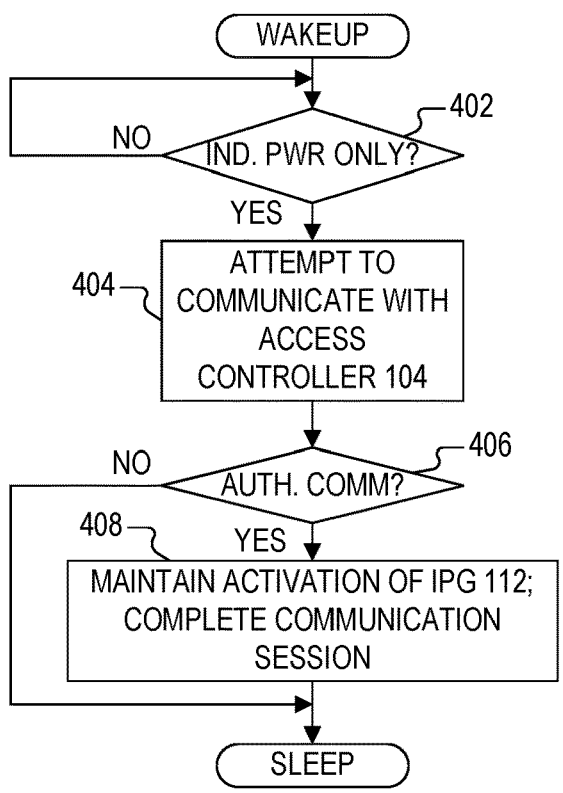
FIG. 4 is a flowchart illustrating operation of the circuitry of the key fob of FIG. 1 during inductive linking according to one embodiment of the present disclosure.

FIG. 4 is a flowchart illustrating operation of the circuitry of the key fob 102 during inductive linking according to one embodiment of the present disclosure. In this case, battery power from the battery 208 is not available (disconnected, absent, discharged) and an inductive link is established. When the key fob 102 is powered up, operation advances to block 402 to query whether power is being provided only by the inductive link of the inductive power circuit 220. Although not explicitly shown, additional detection circuitry, such as a battery detector or inductive field detector or the like, provides an indication to the COM circuitry 202 regarding the source of power within the key fob 102, such as either from the battery 208 or the inductive power circuit 220. If power is not provided by the inductive link, then the battery 208 may be available so that normal operations apply. In this case, the functions of inductive coupling do not apply and operation loops at block 402. If power is only being provided by the inductive link, then operation advances to block 404 in which the COM circuitry 202 attempts to establish authorized communications with the COM circuitry of the access controller 104. Assuming authorized communications are established as determined at next query block 406, then operation advances to block 408 in which the communication session is completed while maintaining activation of the IPG 112. In one embodiment, the key fob 102 commands or otherwise indicates whether the IPG 112 is needed or not. In another embodiment, power via the inductive link is detected by the IPG 112 which communicates to the access controller 104 the need to remain activated. The circuitry of the key fob 102 then goes back to sleep after communications are completed. Referring back to block 406, if authorized communications are not established with the access controller 104, then power may be provided by another device without the access controller 104 and circuitry of the key fob 102 goes back to sleep.

A key fob according to one embodiment includes at least one wireless communication circuit, a power supply node coupled to provide power to the at least one wireless communication circuit, a battery node, a battery power circuit, and an inductive power circuit for only providing power. The battery power circuit provides power when a battery with sufficient charge is provided. The inductive power circuit provides power when energized with inductive power when the battery is not provided or is not sufficiently charged, in which the inductive power circuit does not perform wireless communications thereby simplifying circuitry and operation of the key fob and a corresponding access system. The inductive power circuit may include a rectifier circuit and an inductor and may further include regulator circuitry. Since only configured to transfer power, the inductive power circuit may be optimized for power transfer. The access system inductively provides power to the key fob when within a predetermined coupling zone distance.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. For example, variations of positive logic or negative logic may be used in various embodiments in which the present invention is not limited to specific logic polarities, device types or voltage levels or the like. For example, logic states, such as logic low and logic high may be reversed depending upon whether the pin or signal is implemented in positive or negative logic or the like. In some cases, the logic state may be programmable in which the logic state may be reversed for a given logic function.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

What is claimed is:

1. A key fob system, comprising:
a key fob, comprising:
at least one wireless communication circuit;
a power supply node coupled to provide power to the at least one wireless communication circuit;
a battery node;
a battery power circuit that provides power via the power supply node when a battery with sufficient charge is coupled to the battery node; and
an inductive power circuit that only provides power via the power supply node when energized with inductive power and when the battery node does not provide power;
an access system, comprising an inductive power generator that can inductively couple to the inductive power circuit of the key fob when the inductive power circuit is within a predetermined coupling zone distance of the inductive power generator;
an access controller comprising at least one wireless communication circuit;
a sensor that senses and reports presence of the key fob to the access controller; and
wherein when the presence is detected, the inductive power generator activates and the access controller attempts to establish wireless communications with the key fob.

2. The key fob system of claim 1, wherein the access controller maintains activation of the inductive power generator when indicated by the key fob after establishing wireless communications.

3. The key fob system of claim 1, wherein the access controller and the key fob wireless communicate with each other according to Bluetooth.

4. The key fob system of claim 1, wherein the access controller and the key fob each include a wireless Bluetooth communication circuit and a wireless ultra-wideband communication circuit.

5. The key fob system of claim 1, wherein the sensor comprises a button.

6. The key fob system of claim 1, wherein the sensor comprises a capacitive sensor.

7. The key fob system of claim 1, wherein the inductive power circuit comprises a rectifier circuit and an inductor.

8. The key fob system of claim 7, wherein the inductive power circuit further comprises regulation circuitry coupled to the power supply node.

9. The key fob system of claim 1, wherein the inductive power circuit and the inductive power generator are not configured to perform wireless communications.

10. The key fob system of claim 1, wherein the inductive power circuit is optimized for inductive power transfer.

11. A method for controlling access to a vehicle, comprising:
    detecting, by a sensor, presence of a key fob in the vicinity of the vehicle;
    when the presence of the key fob is detected,
        providing inductive power to an inductive element in the key fob from an inductive power generator in the vehicle, wherein the inductive power is used to operate components in the key fob when there is insufficient power from a battery in the key fob;
    establishing wireless communications between the vehicle and the key fob after the inductive power is provided to the key fob.

12. The method of claim 11, further comprising continuing to provide inductive power to the authorized key fob after establishing the wireless communications.

13. The method of claim 11, further comprising establishing the wireless communication using a Bluetooth communication circuit.

14. The method of claim 11, further comprising establishing a wireless communication using an ultra-wideband communication circuit.

15. The method of claim 11, wherein the sensor comprises a button.

16. The method of claim 11, wherein the sensor comprises a capacitive sensor.

17. The method of claim 11, wherein the inductive power generator is not configured to perform wireless communications.

18. The method of claim 11, further comprising determining a distance between the vehicle and the key fob using distance measuring circuitry in the vehicle.

19. The method of claim 11, further comprising authenticating the key fob using access control circuitry in the vehicle before establishing the wireless communications.

20. The method of claim 11, further comprising receiving from the key fob an indicator of whether the key fob is operating on battery power or the inductive power.

* * * * *